United States Patent [19]

Fourez et al.

[11] Patent Number: 4,799,959
[45] Date of Patent: Jan. 24, 1989

[54] ANTICORROSION COATING COMPOSITION, PROCESS FOR APPLYING IT AND COATED THREADED COMPONENTS

[76] Inventors: Michel Fourez, 9, rue Jean-Jaures, Thiverny, 60160 Montataire; Michel Lonca, 303, route de Rantigny, Vaux sous Cambronne, 60290 Rantigny; Patrick Pichant, 3 Alle des Charmes, 60300 Avilly St. Leonard, all of France

[21] Appl. No.: 22,818

[22] Filed: Mar. 6, 1987

Related U.S. Application Data

[63] Continuation-in-part of Ser. No. 715,009, Mar. 22, 1985, abandoned.

[30] Foreign Application Priority Data

Mar. 26, 1984 [FR] France ................... 84 04661

[51] Int. Cl.$^4$ ............................................. C04B 9/02
[52] U.S. Cl. ..................... 106/1.16; 106/14.21; 148/6.2; 148/6.15 Z
[58] Field of Search ............... 106/1.16, 14.21, 193 M; 252/26; 204/23; 148/6.15 Z, 6.2

[56] References Cited

U.S. PATENT DOCUMENTS

| | | |
|---|---|---|
| 2,470,269 | 5/1949 | Schaefer .................... 106/36 |
| 2,562,117 | 7/1951 | Osdal ........................ 148/6.2 |
| 3,053,702 | 9/1962 | Schuster et al. ........... 148/6.2 |
| 3,351,504 | 11/1967 | DeHart ...................... 148/6.2 |
| 3,785,854 | 1/1974 | Baldi ......................... 428/651 |
| 3,948,686 | 4/1976 | Lochner et al. .......... 148/6.15 R |
| 3,979,351 | 9/1976 | Sekhon ...................... 524/21.7 |
| 4,243,434 | 1/1981 | Hartley et al. ............ 148/6.15 R |
| 4,266,975 | 5/1981 | Higashiyama et al. ... 106/1.12 |
| 4,365,003 | 12/1982 | Danforth et al. .......... 148/6.2 |
| 4,411,742 | 10/1983 | Donakowski et al. .... 204/23 |
| 4,487,815 | 12/1984 | Dorsett et al. ............ 148/6.2 |
| 4,525,287 | 6/1985 | Carstensen ................. 252/26 |

FOREIGN PATENT DOCUMENTS 1019202 2/1966 United Kingdom .

*Primary Examiner*—Theodore Morris
*Attorney, Agent, or Firm*—John J. Freer

[57] ABSTRACT

The present invention relates to improved coating compositions intended to improve the characteristics of a metal substrate, especially threaded substrates. The composition incorporates at least a liquid composition containing hexavalent chromium, and a powdered metal. The composition additionally incorporates a lubricant which is solid at the temperature of use of the substrate. The invention also relates to a process for making use of these compositions and to threaded components coated in this manner.

15 Claims, No Drawings

ANTICORROSION COATING COMPOSITION, PROCESS FOR APPLYING IT AND COATED THREADED COMPONENTS

This application is a continuation-in-part of U.S. Ser. No. 06/715,009 filed Mar. 22, 1985 and now abandoned.

BACKGROUND OF THE INVENTION

The present invention relates to an anticorrosion coating composition which can be used, in particular, to protect threaded devices. The invention also relates to a process for its application as well as to threaded devices coated in this manner.

There are known processes for coating metal substrates with compositions containing hexavalent chromium, which is frequently supplied by chromic acid, in order to impart corrosion resistance to such as metal nut-and-bolt substrates.

French Pat. No. 2,008,770 (U.S. Pat. No. 3,671,331) describes an improvement to this type of composition in which a powdered metal is added in order to improve corrosion resistance. French Pat. No. 2,149,434 (U.S. Pat. No. 3,907,608) describes another improvement to the above compositions making it possible to improve the characteristics of the coating produced and to facilitate its application. U.S. Pat. No. 4,266,975 describes improved coating compositions containing substances such as boric acid, and as also described in French Pat. No. 2,008,770.

In general, the application of an anticorrosion coating to bolts, screws or nuts, whether this coating be of the electrolytic coating type, a paint coating or a coating produced from solutions of hexavalent chromium, modifies the characteristics of the threaded zone. These modifications are, in general, excessive thicknesses, modifications of surface properties (slip, adhesion, reliability of the coating) or thread damage.

These modifications result in inadequate tensions in the threaded portions to produce a reliable assembly, even with high clamping torques.

Very frequently, the problem is made still worse if the same parts are once again loosened and retightened; the tensions obtained are then still lower and consequently the assemblies are still less resistant to external stresses.

Thus, in the field of threaded components, where the standards are increasingly exacting, especially on automated assembly lines, it would be desirable to have available compositions which, in addition to outstanding corrosion resistance, could impart to the threaded elements properties making it possible to obtain high tensions in the assembly.

Thus, the coating should, preferably, make it possible to obtain a specified tension value which is generally equal to 80% of the elastic limit of the bolt.

In addition, it is advantageous to be able to obtain good reliability of the values of the tension/clamping torque relationship from one clamping operation to another with the same bolt or different bolts.

While the coatings according to the prior art are perfectly satisfactory from the point of view of anticorrosion properties, they have occasionally been found inadequate from the point of view of the mechanical properties outlined earlier.

SUMMARY OF THE INVENTION

The present invention offers compositions which, while retaining the anticorrosion properties of compositions based on hexavalent chromium, clearly improve the mechanical properties of the coating obtained.

The present invention offers improved compositions intended to improve the corrosion resistance of metal substrates, particularly of substrates incorporating threaded portions such as bolts, screws and nuts. The compositions, exclusive of lubricant, are of the type that are phosphate-free as well as substantially resin-free and incorporate at least:

(a) a liquid composition containing hexavalent chromium, (b) a particulate metal, and which compositions additionally incorporate a lubricant which is solid at the temperature of use of the substrate.

The use of a solid lubricant makes it possible to improve in a decisive and wholly unexpected manner the mechanical properties of the coatings produced, as will be demonstrated in the tests reported hereafter.

The compositions of the type that are phosphate-free and substantially resin-free and that can be useful in the invention are known and are described particularly in French Pat. No. 2,008,770 and U.S. Pat. No. 4,266,975 and are marketed under the name of DACROMET (Trademark of Metal Coatings International Inc.). Alternate forms of the compositions in question may be understood by particular reference to these patents. But the compositions in addition to being free of phosphate are also preferably free of resin.

The compositions according to the present invention are preferably in the form of at least two separate packages i.e., components, which are mixed only at the time of use, this being to avoid side reactions.

Thus, in general, the compositions according to the invention incorporate at least:

(a) a package containing chromium and consisting of a solution of hexavalent chromium, for example chromic acid, and (b) a package free of chromium and incorporating the particulate metal such as zinc, manganese, aluminum, magnesium, their mixtures and their alloys, in general in the form of a dispersion, particularly of a paste or a thick liquid.

These compositions occasionally incorporate a third component which is a thickener, which can itself also be packaged separately.

The present invention relates, moreover, to a process for coating substrates which makes use of the compositions according to the present invention.

In this process:

coating of the substrate with the composition is carried out, and the coated substrate is heated until the curing of the coating on the substrate.

Naturally the invention relates to the compositions in which the various components are packaged separately as well as the total mixture of these various packages.

Lastly, the invention relates to components incorporating threading, especially screws, bolts or nuts, incorporating as a coating the residue obtained after heating a composition such as described previously.

DESCRIPTION OF THE PREFERRED EMBODIMENTS

In the compositions according to the invention, the solid lubricant, which is preferably a fluorinated polymer such as polytetrafluoroethylene (PTFE), $MoS_2$, or graphite, or their mixtures, is preferably mixed with the particulate metal, but may also be packaged separately. The solid lubricant is preferably in a finely divided form, for example a powder or microspheres, and is preferably dispersed in the presence of a nonionic surface-active agent (dispersant or surfactant) such as a polyethoxy alkylphenol addition compound, for example Triton CF 54 (Rohm and Haas). This surface-active agent is employed in a quantity of between, preferably 1 to 25 grams per liter (g/l) of the total composition, preferably in the proportion of 5 to 10 g/l, because this component clearly improves the resistance of the coatings according to the invention. This surfactant will also permit the dispersion of the various components of the composition, especially the particulate metal. The solid lubricants are employed in quantities such that they result in concentrations by volume of on the order of 0.5 to less than 10% of the dry coating.

The package (component) of the hexavalent chromium compositions in liquid medium may be particularly aqueous solutions of chromic acid or solutions of hexavalent chromium salt, or hexavalent chromium in another form. As already described in the U.S. Pat. No. 4,266,975, the teachings of which are incorporated herein by reference, the liquid hexavalent chromium compositions may contain boric acid in a quantity of between 5 and 95% by weight of the chromic acid component. These solutions may additionally contain other solvents such as alcohols, ethers or various hydrocarbons; for reasons of convenience, aqueous solutions will naturally be preferred.

The compositions according to the invention contain a reducing agent, insofar as need be. The reduced agent may be supplied by a polyol which also can serve wholly or partly as a carrier (liquid vehicle for the liquid medium) for one of the packages of the composition. Thus the particulate metal, e.g., powdered metal, in particular zinc, is generally packaged, before being mixed into the total composition, in the form of a paste or a thick liquid in a polyol or a polyol ether such as dipropylene glycol or diethylene glycol monoethyl ether. This package sometimes may also contain the solid lubricant, but is otherwise resin-free and always phosphate-free.

The packages according to the invention may additionally contain other elements or ingredients. When the additional component is a thickening agent, it may be separately packaged, or can be included with the particulate metal. It may consist of a water-soluble nonionic polymer, such as a cellulose derivative, for example hydroxyethyl cellulose (HEC).

Although it is possible to envisage using the various packages of the composition separately, it will virtually always be preferred to carry out the coating of the substrate with a mixture incorporating all the components of the composition. When the mixture obtained is homogeneous, coating of the substrate is carried out by the use of any suitable method, particularly by dipping, especially when nut-and-bolt components are involved. In order to ensure coating uniformity, the coating should be drained off, for example by centrifuging.

The curing that follows includes the evaporation of the solvents and the internal chemical reactions which make it possible to obtain the formation of an adhering, corrosion-resistant coating. The exact conditions in the heating stage for the curing will depend on the precise nature of the coating. Generally, the heating will take place at temperatures of between 220° and 350° C. for a time ranging from a few seconds to several hours, depending on the temperature. Preferably, heating of the order of 280° to 320° C. for some tens of minutes will be employed.

In general, the coating and curing steps may be carried out several times. Articles coated in this way may be optionally subjected to other treatments, such as a paint or topcoating. Although many metal substrates are contemplated, the compositions according to the invention will most often be used on substrates that are useful for preparing threaded fasteners, such as steel and finished metals such as zinc plated steel.

The following example shows a way in which the invention has been practiced, but should not be construed as limiting the invention.

EXAMPLE

The following tests make it possible to illustrate other features and advantages of the present invention.

The composition employed is as follows:

| Package A | |
|---|---|
| flake zinc | 25.0% by weight of the total mixture |
| dipropylene glycol | 16.5% by weight of the total mixture |
| nonionic dispersant* | 0.5% by weight of the total mixture |
| Package B | |
| thickener** | 0.5% by weight of the total mixture |
| Package C | |
| boric acid | 1.3% by weight of the total mixture |
| chromic acid | 3.7% by weight of the total mixture |
| zinc oxide*** | 0.9% by weight of the total mixture |
| and water, to make 100%; the composition is thus resin and phosphate-free. | |

*Nonionic dispersant = Triton CF 54
**Thickener = HEC cellulose derivative thickener
***pH modifier The polytetroethylene (PTFE) employed is HOSTAFLON TF VP 92.05 marketed by Hoechst, M. W. 35,000–100,000 mean particle diameter 5 to 7 microns.

The treatment is carried out as follows:

The substrates, screws or bolts, are pretreated in a conventional manner by alkaline degreasing, rinsing and micro-sandblasting, for example, and then dipping in a bath obtained by mixing the three packages A, B and C as already described in U.S. Pat. No. 4,365,003. After the dipping, the substrate is centrifuged to remove the excess composition and then subjected to baking at temperatures of the order of 300° C. for approximately 30 minutes. The dipping, centrifuging and baking cycle may be renewed to obtain a coating approximately 6 to 8 microns in thickness.

The following tests were carried out:

A study was made of the relative change in the clamping torque and tension in a threaded assembly for various coating compositions according to the invention and according to the prior art.

The coatings were applied to bolts:
Phi (bolt diameter): 10 mm
Pitch (thread pitch): 1.5

Quality (Grade): 10.9
and then the clamping is applied to a galvanized dichromate-threaded nut, of quality (grade) 10.

The compositions according to the present invention incorporate variable proportions of PTFE, shown as percentage by volume of the coating.

The comparison tests were carried out for the following coatings:
  series 1: DACROMET (product of Metal Coatings International Inc.)
  series 2: dichromated electrolytic zinc coating 10-12 microns
  series 3: dichromated electrolytic cadmium coating 10-12 microns.

The total clamping torque, the clamping torque under head and the tension are recorded using an Erichsen apparatus.

Under the test conditions with the bolts having a dichromated galvanized coating, it was not possible to obtain 80% of the elastic limit on clamping and a wide scatter was found in the slopes of the curves from one clamping operation to another.

Treatment with DACROMET alone is more satisfactory, although it is sometimes difficult to obtain 80% of the elastic limit.

The results found with the dichromate cadmium coating lie close to those found for the DACROMET coating, but the presence of cadmium can be undesirable in industrial use, for ecological reasons.

On the other hand, the compositions according to the present invention permit lower clamping torques for equivalent tensions.

With a proportion of 5 to 7.5% of PTFE, 80% of the elastic limit can be exceeded in every clamping operation.

With these proportions an outstanding reliability is also obtained in the relative values of tension/clamping torque from one clamping operation to another with the same bolt or a different bolt.

The results measured are collated in the following table:

TABLE

| Series No. | Coating | Total Clamping Torque at 60% of the Elastic Limit in Newton Meters (Nm) |
|---|---|---|
| 1 | DACROMET | 77 |
| 2 | Galvanized dichromated 10-12 microns | 85 |
| 3 | Cadmium-coated dichromated 10-12 microns | 63 |
| 4 | Composition 1 (7.5% PTFE) | 54 |
| 5 | Composition 2 (5% PTFE) | 59 |
| 6 | Composition 3 (2.5% PTFE) | 64 |

Series 4 to 6 according to the invention are carried out by adding to the standard DACROMET various quantities of PTFE which are shown in % by volume of the dry coating; 60% of the elastic limit corresponds to 31,000N (Newtons).

These tests have demonstrated that using the coatings according to the present invention it was possible to obtain, in addition to anticorrosion properties:
  better control of the clamping operations,
  high tensions close to the elastic limit,
  retention of these properties after several threading and unthreading operations, and
  a robust assembly whatever the conditions of use.

What is claimed is:

1. An aqueous anticorrosion coating composition for application to metal substrates, the composition, exclusive of lubricant, being provided by resin-free substituents including a phosphate-free hexavalent-chromium-providing component and particulate metal, while including organic liquid vehicle, which composition additionally contains lubricant comprising molybdenum disulfide, graphite, fluorinated polymer or their mixtures, and which lubricant is solid at the temperature of use of the substrate and is present in the coating composition in an amount sufficient to provide less than about 10 percent by volume of said lubricant in cured coating, and with the particulate metal of the composition being metal powder, metal flake or their mixtures, while being selected from the group consisting of zinc, manganese, aluminum, magnesium, their mixtures and their alloys.

2. The coating composition of claim 1, wherein said hexavalent-chromium-providing component additionally contains boric acid.

3. The coating composition of claim 1, wherein said hexavalent-chromium-providing component additionally contains pH modifier.

4. The coating composition of claim 1, wherein said organic liquid vehicle comprises a polyol or polyol ether or their mixtures.

5. The coating composition of claim 1, wherein the composition additionally contains thickening agent.

6. The coating composition of claim 1, wherein the composition additionally contains dispersing agent.

7. The coating composition of claim 1, wherein said lubricant is present in an amount sufficient to provide at least about 0.5 volume percent of lubricant in cured coating.

8. A coating composition component adapted for blending with a package containing hexavalent chromium in solution, said component being free of chromium as well as phosphate-free and providing, in said blending, a coating composition for application to a metal substrate for achieving a corrosion-resistant coating thereon, said component comprising particulate metal, lubricant comprising molybdenum disulfide, graphite, fluorinated polymer or their mixtures, and surface-active agent in an amount sufficient to provide said coating composition with from 1 to 25 grams per liter of agent, which lubricant is solid at the temperature of use of the substrate and is present in the composition component in an amount sufficient to provide less than about 10 percent by volume of said lubricant in said coating.

9. The coating composition component of claim 8, wherein said particulate metal is metal powder or metal flake or their mixtures and is selected from the group consisting of zinc, manganese, aluminum, magnesium, their mixtures and their alloys.

10. The coating composition component of claim 8, wherein said lubricant is present in an amount sufficient to provide at least about 0.5 volume percent of lubricant in the coating.

11. The coating composition component of claim 8, wherein said particulate metal and lubricant are present in an organic liquid vehicle.

12. The coating composition component of claim 11, wherein said organic liquid vehicle is polyol or polyol ether providing a paste or viscous liquid component.

13. The coating composition component of claim 8, wherein said component additionally contains thickening agent.

14. The coating composition component of claim 13, wherein said thickening agent comprises cellulose derivative thickener.

15. In the method of preparing a corrosion resistant coating composition from starting packages of at least a particulate metal package and a package of hexavalent-chromium in solution to separate, before combining packages, said particulate metal from said hexavalent chromium and to prepare a resin-free and phosphate-free composition from said starting packages, said composition being for application to a metal substrate for providing a corrosion-resistant coating thereon, the improvement comprising preparing said particulate metal package with lubricant which is solid at the temperature of use of the substrate, and is present in said package in an amount sufficient to provide less than about 10% by volume of lubricant in said coating, and combining said particulate metal and lubricant package with said hexavalent chromium package to prepare said corrosion-resistant coating composition for application to a metal substrate.

* * * * *